Jan. 1, 1924 1,479,700
A. R. K. DJURSON
SLACK ADJUSTER FOR BRAKES
Filed Sept. 29, 1921
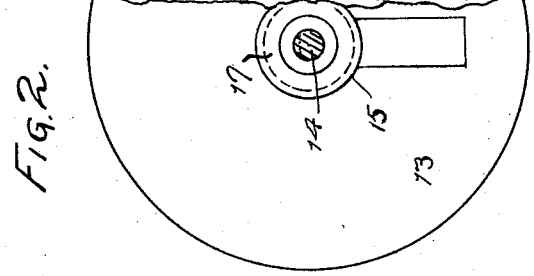
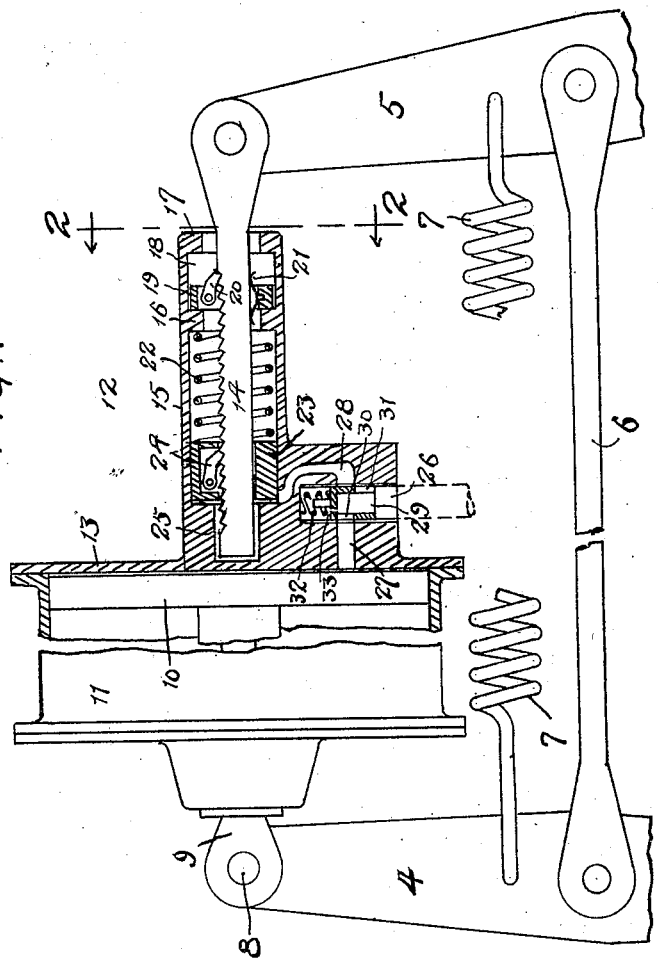
INVENTOR
AXEL R. K. DJURSON
BY
ATTORNEYS Patented Jan. 1, 1924.

1,479,700

UNITED STATES PATENT OFFICE.

AXEL RUDOLF KONRAD DJURSON, OF MALMO, SWEDEN.

SLACK ADJUSTER FOR BRAKES.

Application filed September 29, 1921. Serial No. 504,218.

*To all whom it may concern:*

Be it known that I, AXEL RUDOLF KONRAD DJURSON, a citizen of Sweden, and resident of Malmo, Sweden (whose post-office address is Malmo, Sweden), have invented new and useful Improvements in Slack Adjusters for Brakes, of which the following is a specification.

My invention relates to slack adjuster for brakes, and particularly to an automatic adjuster. The object of my invention is to provide an improved device of this character having certain novel features of construction and operation hereinafter set forth or shown in the accompanying drawing, in which—

Fig. 1 is a more or less diagrammatic broken side elevation of a brake cylinder and associated parts illustrative of the invention; and Fig. 2 is a section on the line 2—2, Fig. 1.

The usual brake levers 4 and 5 are joined by the connecting rod 6 intermediate their ends, while their lower ends (not shown) are connected as usual to the brake bars (not shown). A return spring, or some other device, 7 extending between the brake levers retracts the latter to normal position after braking pressure has been relieved.

The lever 4 is jointed at 8 to the outer end of the piston rod 9, which extends from the piston 10 through one end of the brake cylinder 11. The slack-adjusting device, generally indicated by the reference 12, may be mounted in any suitable position, for example, upon the head 13 of the cylinder adjacent which the piston 10 normally rests.

More specifically the present automatic slack adjuster to which the invention relates, comprises an adjuster bar 14 having ratchet teeth formed in one face. It is joined at one end to the brake lever 5 and extends longitudinally into the auxiliary or adjuster-operating cylinder 15. Within the latter is a stop flange 16 spaced a predetermined distance from the outer end 17 of the cylinder. Working in the space 18 between the stop 16 and the cylinder end 17 is the take-up device in the form of a ring 19, having a one-way connection with the bar 14 through the ratchet dog 20 pivoted on the ring. A spring 21 on the take-up 19 bears against another face of the bar 14 and affords a frictional grip thereon which serves to carry the take-up with the bar on its outward movement, hereinafter described.

Against the opposite side of the stop 16 bears a coil spring 22 which thrusts against the piston 23 working in the adjuster cylinder 15. This piston also has a one-way engagement with the adjuster bar 14 through a dog 24 pivoted on the piston. The bar 14 passes through the piston and extends into the small chamber 25 formed in extension of the piston chamber 15.

The air pressure pipe is connected at the port 26, and the air duct therefrom is branched, one branch 27 leading to the chamber of the brake cylinder 11, while the other branch 28 leads to the adjuster cylinder 15. Controlling these branches is a piston valve 29 having a pair of ports 30 and 31, and a valve spring 32 which normally maintains the valve in the position indicated, that is to say, with the port 30 in register with the duct 27 leading to the brake cylinder. In its lifted position, however, the port 30 is moved out of register with the duct 27, and the port 31 moved into register with the duct 28. A relief passage 33 in the head of the valve permits equilibrium to be rapidly established on opposite sides thereof.

The operation of the device is as follows: Assuming air pressure to be admitted at the port 26, the piston valve 29 is at once displaced to close the duct 27, and to open the duct 28 to the pressure. The adjuster piston 23 is immediately advanced, and with it the adjuster bar 14, by reason of the one-way connection through the dog 24. The take-up 19 is also carried forward in its chamber 18 by reason of the frictional engagement of the spring 21 with the adjuster bar. If the distance of the brake shoes from the wheels be proper, the outward movement of the bar 14 will have brought the shoes into engagement with the wheels by the time the take-up 19 has reached the end 17 of the adjuster cylinder 15. The valve having now returned under the influence of its spring 32 to normal position by reason of the equalization of pressure on both sides thereof through port 33 and the air pressure being thus admitted to the brake cylinder, the piston 10 of the latter is advanced and exerts the desired braking pressure on the levers 4 and 5 through the connecting rod 9. This forces the bar 14, piston 23 and ring 19 back to their initial positions, the leakage of piston 23 being sufficient to permit the escape of the air from cylinder 15.

Should the brake shoes be too far from the wheels, however, when pressure is applied at the port 26, the forward movement of the piston 23 is greater than the distance at which the stop 16 is spaced from the cylinder end 17, with the result that the adjuster bar 14 is forced through the take-up 19 when the latter is halted at 17. Its dog 20 therefore overruns one or more teeth on the ratchet. On the return of the bar 14 at the end of the braking operation, it is halted by the engagement of the take-up 19 against the stop 16, before the piston 23 has reached the end of the cylinder 15. The spring 22 now forces the piston 23 back to its normal position independently of the bar 14 and the dog 24 on the piston overruns a tooth on the ratchet corresponding to that overrun by the dog 20 of the take-up 19 on the outward movement of the bar. Thus, the bar 14 is now held in a position further out than previously, and the brake shoes are thereby forced nearer the wheel. As the brake shoes were down, the operation of the slack adjuster is repeated and the distance of the shoes from the wheels thus maintained substantially uniform at all times.

The arrangement indicated has the marked advantage of using but a very small quantity of air to actuate the piston 23 which works in a small cylinder, and has but a limited stroke. Its operation is automatic and certain, since it functions on every admission of pressure to the line, and always operates in advance of the movement of the brake piston 10. The play of the take-up 19 in the chamber 18 accurately determines the amount of slack permitted the brakes, and this may be predetermined with exactitude to meet different conditions.

The particular construction of the parts shown in the drawing are of course of no particular moment. Thus, the one-way connection between the adjuster bar 14 on the one hand, and the piston 23 and take-up 19 on the other hand, may be variously modified. Similarly, valve 29 may be of any suitable type.

With the understanding that various modifications of structure may be made without departing from what I claim as my invention, I claim—

1. In an air-brake system, a brake cylinder, a slack adjuster cylinder, a piston working in the latter, a slack adjuster bar operated by the piston, and means automatically varying the path of travel of said bar upon a variation of slack in the braking system.

2. In an air-brake system, a brake cylinder, a slack adjuster cylinder, a piston working in the latter, a slack adjuster bar operated by said piston, and means for automatically varying the position of said bar with relation to the piston on a variation of slack in the braking system.

3. In an air-brake system, a brake cylinder, a slack adjuster cylinder, a piston working in the latter, a slack adjuster bar operated by the piston, and means for admitting air under pressure successively to the slack adjuster cylinder and to the brake cylinder, in the order named.

4. In an air-brake system, a brake cylinder, a slack adjuster cylinder, a piston working in the latter, a slack adjuster bar operated by the piston, and means for admitting air under pressure successively to the slack adjuster cylinder and to the brake cylinder in the order named, together with means for varying the path of travel of the slack adjuster bar with a variation of slack in the brake system.

5. In an air-brake system, a slack adjuster cylinder, a piston working therein, a slack adjuster bar and a one-way operating connection between the piston and the adjuster bar.

6. In an air-brake system, a slack adjuster cylinder, a piston working therein, a slack adjuster bar and a one-way operating connection between the piston and the bar, together with means to halt the bar and permit the piston to move with relation to the latter in a direction opposed to its one-way connection, upon the occurrence of excessive slack in the braking system.

7. In an air-brake system, a slack adjuster comprising an adjuster bar, means for operating the same on each braking operation but in advance of the exertion of braking effort, a take-up associated with the bar, means for halting the movement of said takeup in one direction without impeding the movement of the bar in said direction, and means limiting the movement of both the take-up and bar in the opposite direction.

In testimony whereof I have signed my name to this specification.

AXEL RUDOLF KONRAD DJURSON.